United States Patent
Waibel et al.

(10) Patent No.: US 6,624,881 B2
(45) Date of Patent: Sep. 23, 2003

(54) OPTOELECTRONIC LASER DISTANCE-MEASURING INSTRUMENT

(75) Inventors: Reinhard Waibel, Berneck (CH); Torsten Gogolla, Frastanz (AT); Andreas Winter, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/032,672

(22) Filed: Oct. 25, 2001

(65) Prior Publication Data

US 2002/0067475 A1 Jun. 6, 2002

(30) Foreign Application Priority Data

Nov. 9, 2000 (DE) .......................... 100 55 510

(51) Int. Cl.[7] .............................. G01C 3/08; G01C 3/00
(52) U.S. Cl. ...................................... 356/4.01; 356/3.01
(58) Field of Search ................................ 356/3.01–5.15

(56) References Cited

U.S. PATENT DOCUMENTS

| | | | |
|---|---|---|---|
| 4,501,961 A | * | 2/1985 | Stauffer |
| 4,730,190 A | * | 3/1988 | Win et al. .................... 342/118 |
| 5,491,546 A | * | 2/1996 | Wascher et al. ........... 356/4.03 |
| 5,644,386 A | * | 7/1997 | Jenkins et al. ............. 356/4.01 |
| 5,699,149 A | * | 12/1997 | Kuroda et al. ............. 356/4.01 |
| 6,137,564 A | * | 10/2000 | Schmidt et al. ............ 356/4.01 |
| 6,346,980 B1 | * | 2/2002 | Tani et al. .................. 356/4.01 |

FOREIGN PATENT DOCUMENTS

JP 626115 * 1/1987

* cited by examiner

*Primary Examiner*—Stephen C. Buczinski
(74) *Attorney, Agent, or Firm*—Sidney Austin Brown & Wood, LLP

(57) ABSTRACT

An optoelectronic laser distance-measuring instrument (1) with preselectable or sensitive reference points (3a, 3b, 3c) arranged on the outer edge of a portable housing (2) and having a radiation source (4), an associated radiation receiver (5) for a laser beam (6), a microcontroller (9), keypad (10), a display (11), which can be read off from the handling distance, for the depiction of a measured result (14), a camera lens (7) that is aimed in the direction of the laser beam (6) and has a image sensor (8), whose detected target area (12) can be graphically depicted on the display (11) at least partially together with a virtual measuring spot (13) calculated by the microcontroller (9) as well as with the measured result (14).

10 Claims, 1 Drawing Sheet

OPTOELECTRONIC LASER DISTANCE-MEASURING INSTRUMENT

BACKGROUND OF THE INVENTION

1. Field of the Invention

The invention relates to an optoelectronic laser distance-measuring instrument for precisely measuring the distance between two stationary objects, especially for use on construction sites.

2. Description of the Prior Act

Laser distance-measuring instruments emit a modulated laser beam which, after being reflected on the target object, is received again, demodulated and converted by using a time base and a microcontroller into a target distance from the instrument oriented along the beam axis which is then displayed, usually on a display that is generally integrated into the instrument.

U.S. Pat. No. 3,892,466 describes an artillery control system that combines an optically imaging system with a laser distance-measuring instrument and a computer system.

WO 99/17135 discloses a laser distance-measuring instrument that is integrated into an imaging optical instrument, whereby the measuring mark and the associated distance are overlaid in the optically zoomable target image by a microcontroller having an image processing stage and an integrated display.

When it comes to laser distance-measuring instruments, to which this invention relates, the microcontroller calculates, based on the measured target distance to a target object and a basic distance to a basic object, which is situated outside of the instrument along the beam axis, previously input into the microcontroller, the distance between these stationary objects and which is then shown on a display. Since this operation deals exclusively with stationary objects, the calculated distance is averaged over a time interval of 0.1 to 1 second in order to achieve the necessary precision of the distance measurement within a margin of error of less than 1 to 10 mm.

In the case of portable laser distance-measuring instruments for use on construction sites, the basic distance input into the microcontroller by preselectable or sensitive reference points which are in physical contact with the basic object along the beam axis. Such reference points are, for example, the level back edge, which is configured as a stop surface, and the level front edge as well as the optional stop bar.

According to DE 19836812, such a portable laser distance-measuring instrument with reference points has a radiation source for a visible laser beam, a radiation receiver, a microcontroller with various evaluation procedures, a keypad, a graphic display—which can be read off from the handling distance—for showing the current evaluation procedure as well as the measured result. A drawback, under conditions of large target distances, dark surfaces and bright surroundings, is the poor visibility of the measuring spot as well as the resultant unreliable distance measurement.

In order to improve the visibility of the measuring spot, portable laser distance-measuring instruments are combined with optical target devices. Target devices that are arranged in parallel lead to an unreliable distance measurement because of the parallax error. Moreover, the sighting that takes place by placing the instrument up to at least one eye of the user is inconvenient for distance measurements and even impossible in places that are difficult to access.

According to U.S. Pat. Nos. 3,992,615 and 5,092,670, with a laser distance-measuring instrument, a parallax correction is made. According to U.S. Pat. No. 5,092,670, for purposes of focusing, a video camera is used.

DE 3,223,713 discloses a portable video camera having a parallel offset laser distance-measuring instrument as the distance-measuring instrument for focusing, whereby its laser beam can be swiveled automatically on the basis of a distance-dependent parallax correction and, consequently, the roughly measured distance is always measured in the center of the image segment.

An object of the present invention is a distance measurement that is both reliable, in terms of erroneous measurements due to incorrect sighting, and that uses a portable laser distance-measuring instrument.

SUMMARY OF THE INVENTION

This and other objects of the present invention, which will become apparent hereinafter, are achieved by providing an optoelectronic laser distance-measuring instrument with preselectable or sensitive reference points arranged on the outer edge of a portable housing, and including a radiation source and a radiation receiver for a laser beam, a camera lens with an image sensor in the direction of the laser beam, a microcontroller, a keypad, and a graphic display that serves to graphically show the target area, the virtual measuring spot, and the measuring result and that can be read off from the handling distance.

Thus, from the handling distance, it is possible to obtain a reliable measurement of the distance from the basic object, which is associated with the contacted reference point as the interface of the extended laser beam with the edges of the housing to the selected target object shown on the graphic display with the measuring spot. Thus, suitable reference points are the front and back housing edges, the extension of a tripod attachment or a rod-like, fold-out stop.

Advantageously, the virtual measuring spot can be corrected in the graphic display in terms of the parallax as a function of the measured result, in that the microcontroller, within the image processing algorithm, effects a relative shift of the pixels associated with the target area and the pixels associated with the virtual measuring spot relative to each other, whereby the parallax correction as such is a function of the measured distance, of the instrument-specific basic width and of trigonometric functions. Thus, in the entire measured area, the measuring position can always be reliably read off the display.

Advantageously, the laser distance-measuring instrument can be adjusted via adjustment algorithms of the microcontroller in terms of the distances to the reference points as well as optionally in terms of the parallax error of the virtual measuring spot and in terms of an angularity error between the laser beam and the sighting axis, and this adjustment can be certifiably stored with the date and calibration site by storing it, for example, in a non-volatile, non-erasable memory.

Advantageously, the portable laser distance-measuring instrument has a mass memory such as a memory board to store and document several distance measurements, whereby also advantageously, the graphic depiction of the target area, of the virtual measuring spot and of the measured result are stored.

Advantageously, the distance measurements stored in the mass memory can be transmitted via a conventional interface such as, for example, a universal serial bus (USB), to devices for electronic data processing and they can be printed out for documentation purposes.

Advantageously, a contrast enhancement and an edge enhancement take place in the image processing algorithm of the microcontroller. The contrast enhancement then advantageously takes place through a non-linear, locally steeper characteristic area in the brightness transmission function, the edge enhancement then advantageously takes place by means of a high-pass filtering or Laplace filtering in the spatial video signal.

Advantageously, a software zooming step with an additional optional interpolation is carried out between individual pixels by the microcontroller in the image processing algorithm of the microcontroller by means of a partial area depiction of the target area, which is received from the image sensor at a higher resolution than is needed for the graphic depiction.

Advantageously, the camera lens is combined with the transmitting lens or with the receiving lens in the beam path and the image sensor is associated with the transmitting or receiving lens that is combined with the camera lens, as a result of which there is no need for separate transmitting and receiving lenses.

Advantageously, as an alternative, the camera lens is arranged with the image sensor in a signal-transmitting camera module that can be mounted modularly on the rest of the housing of the optoelectronic laser distance-measuring instrument, as a result of which, if necessary, the graphic depiction and the documentation of the target area can be combined with a prepared, simpler optoelectronic laser distance-measuring instrument.

Advantageously, in order to depict the distance and the target area, the optoelectronic laser distance-measuring instrument is associated with an external display that is hard-wired or wireless, as a result of which it can always be read off conveniently.

The novel features of the present invention, which are considered as characteristics for the invention, are set forth in the appended claims. The invention itself, however, both as to its construction and its mode of operation, together with additional advantages and objectives thereof, will be best understood from the following detailed description of preferred embodiment, when read with reference to the accompanying drawings.

BRIEF DESCRIPTION OF THE DRAWINGS

The drawings show:

Single FIGURE of the drawings shows a schematic view of the laser distance measuring instrument according to the present invention.

DETAILED DESCRIPTION OF THE PREFERRED EMBODIMENTS

Figure 1:
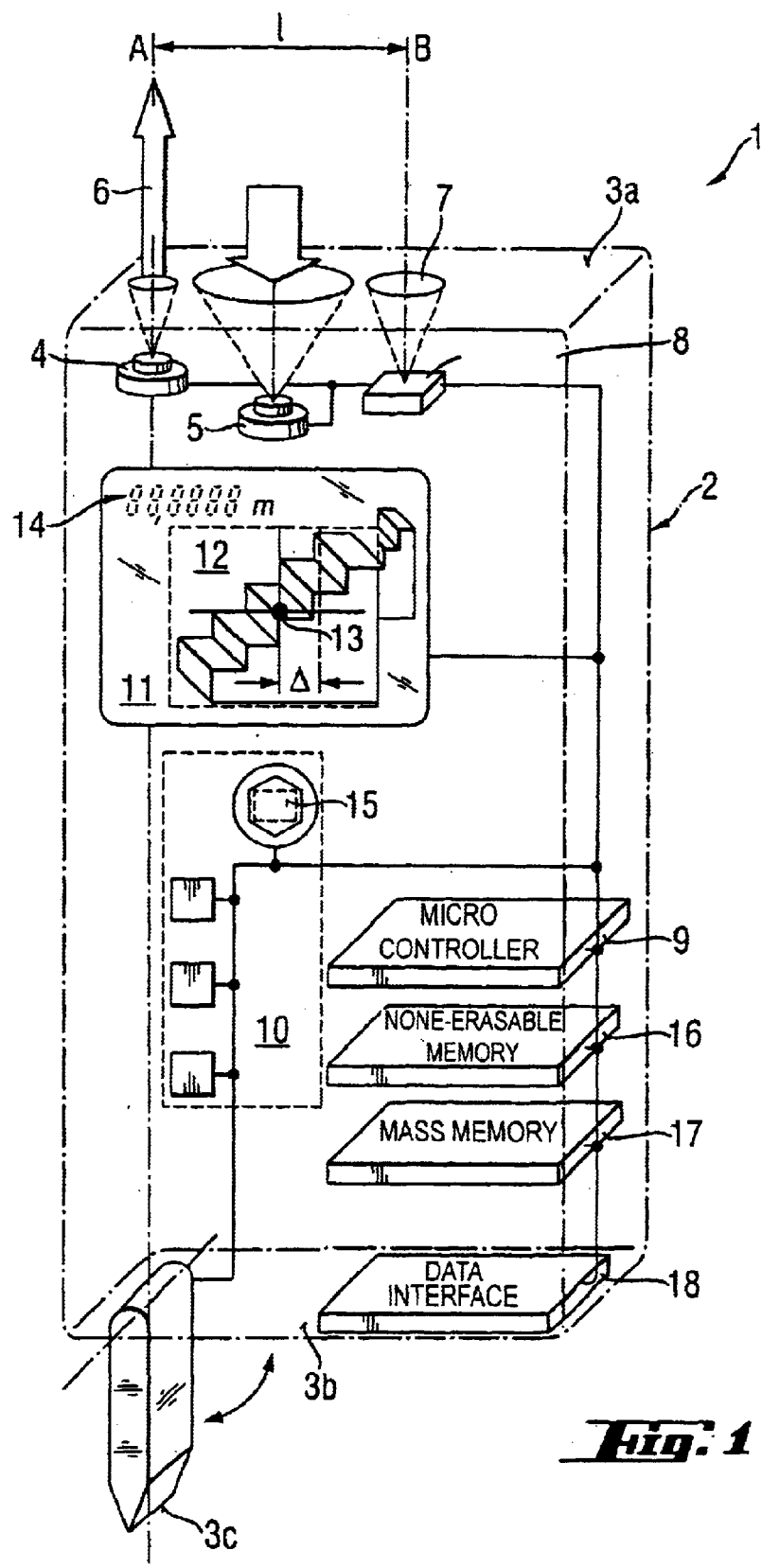

According to FIG. 1, an optoelectronic laser distance-measuring instrument 1 with preselectable reference points 3a, 3b, 3c arranged on the outer edge of a portable housing 2 has a radiation source 4 having a collimation lens and a radiation receiver 5 having a receiving lens for a visible laser beam 6 along a reference axis A. A sighting axis B of a camera lens 7 with an electro-optical image sensor 8 configured as an array with 1024×1024 pixels is offset parallel to the reference axis A by a basic length 1. A microcontroller 9, which is connected with the radiation source 4, with the radiation receiver 5, with the image sensor 8, and with the reference point 3c, which is normally oriented to the reference axis A and which has a rod-like, fold-out back, is also connected to a keypad 10 as well as to a graphic display 11 that can be read off from the handling distance and that has a contrast-enhanced, edge-enhanced and zoomed graphic depiction of the target area 12. A concealed, lockable adjustment key 15 on the keypad 10 can be used to select adjustment algorithms of the microcontroller 9 in terms of the parallax error Δ, of the angularity error as well as of the measured result 14 for the virtual measuring spot 13 relative to the distances to the reference points 3a, 3b, 3c. The housing 2 also contains a non-erasable memory 16, a mass memory 17 and a data interface 18, which are all connected to the microcontroller 9 so as to transmit signals.

Though the present invention was shown and described with references to the preferred embodiment, such is merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiment within the spirit and scope of the present invention as defined by the appended claims.

What is claimed is:

1. An optoelectronic laser distance-measuring instrument, comprising a portable housing (2) with reference points (3a, 3b, 3c) arranged on an outer edge thereof;
    a radiation source (4);
    a radiation receiver (5) for a laser beam (6) and associated with the radiation source (4);
    a microcontroller (9);
    a keypad (10) associated with the microcontroller;
    a read-off from a handling distance, display (11) for displaying a measuring result (14);
    and an aiming in laser beam direction, camera lens (7) with an imaging sensor (8), wherein a target area (12) detected by the camera lens (7) is graphically shown in the display (11), at least partially together with a virtual measuring spot (13) calculated by the microcontroller (9) and with the measuring result (14),
    wherein a position of the virtual measuring spot (13) calculated by the microcontroller (9) can be corrected relative to the target area (12) depicted in the graphic display (11) as a function of the measured result (14) in terms of a parallax error Δ.

2. The optoelectric laser distance-measuring instrument according to claim 1, wherein pixels associated with the target area (12) by the microcontroller (9) and the pixels associated with the virtual measuring spot (13) by the microcontroller (9) can be shifted relative to each other.

3. The optoelectronic laser distance-measuring instrument according to claim 2, wherein distances to the reference point (3a, 3b, 3c) can be adjusted via adjustment algorithms.

4. The optoelectronic laser distance-measuring instrument according to claim 3, wherein at least one of the parallax error (Δ) of the virtual measuring spot (13) and an angularity error can be adjusted with adjustment algorithms.

5. The optoelectronic laser distance-measuring instrument according to claim 4, further comprising a non-erasable memory (16), for storing the adjustment algorithims.

6. The optoelectronic laser distance-measuring instrument according to claim 1, further comprising a mass memory (17).

7. The optoelectronic laser distance-measuring instrument according to claim 1, further comprising a data interface (18).

8. The optoelectronic laser distance-measuring instrument according to claim 1, wherein an image processing algorithm of the microcontroller (9) is configured for an at least one of contrast enhancement and edge enhancement.

9. The optoelectronic laser distance-measuring instrument according to claim 8, wherein the imaging sensor (8) and the image process algorithm of the microcontroller (9) are configured for a software zooming function.

10. The optoelectronic laser distance-measuring instrument according to claim 1, further comprising an external display connected to transmit signals in order to depict the distance and the target area.

* * * * *